(12) United States Patent
Lapp

(10) Patent No.: US 10,130,024 B2
(45) Date of Patent: Nov. 20, 2018

(54) TINE DEPTH STOP MECHANISM FOR SELF-PROPELLED, STAND-ON AERATOR

(71) Applicant: Schiller Grounds Care, Inc., Southampton, PA (US)

(72) Inventor: Jonathan Lapp, Johnson Creek, WI (US)

(73) Assignee: Schiller Grounds Care, Inc., Southampton, PA (US)

( * ) Notice: Subject to any disclaimer, the term of this patent is extended or adjusted under 35 U.S.C. 154(b) by 5 days.

(21) Appl. No.: 15/412,844

(22) Filed: Jan. 23, 2017

(65) Prior Publication Data

US 2018/0206385 A1     Jul. 26, 2018

(51) Int. Cl.
    *A01B 63/00*     (2006.01)
    *A01B 63/10*     (2006.01)
    *A01B 45/02*     (2006.01)

(52) U.S. Cl.
    CPC ............ *A01B 63/002* (2013.01); *A01B 45/02* (2013.01); *A01B 63/10* (2013.01)

(58) Field of Classification Search
    CPC ....... A01B 45/00; A01B 45/02; A01B 45/023; A01B 45/026; A01B 63/002; A01B 63/10
    See application file for complete search history.

(56) References Cited

U.S. PATENT DOCUMENTS

| | | | |
|---|---|---|---|
| 1,778,334 A | 10/1930 | Pederson | |
| 2,088,209 A * | 7/1937 | Nolte | A01B 45/023 111/89 |
| 2,206,264 A * | 7/1940 | Rose | A01B 45/023 172/21 |
| 2,234,534 A | 3/1941 | Reno | |
| 2,302,944 A * | 11/1942 | Helbig | A01B 45/023 111/99 |
| 3,136,274 A * | 6/1964 | Townsend | A01B 45/023 111/118 |
| 3,357,422 A * | 12/1967 | Creelman | A61B 10/0291 600/564 |
| 3,777,460 A | 12/1973 | Mokros | |
| 3,834,246 A | 9/1974 | McGilp | |
| 3,986,562 A * | 10/1976 | Killion | A01B 45/023 111/89 |
| 4,336,760 A | 6/1982 | Cohen et al. | |
| 4,750,565 A | 6/1988 | Hansen et al. | |
| 4,753,298 A | 6/1988 | Hansen et al. | |
| 4,867,244 A | 9/1989 | Cozine et al. | |
| 5,398,769 A | 3/1995 | Staples | |

(Continued)

*Primary Examiner* — Jamie L McGowan
(74) *Attorney, Agent, or Firm* — Panitch Schwarze Belisario & Nadel LLP

(57) ABSTRACT

In an aerator including a chassis mounted on wheels, a tine depth stop mechanism includes a base mounted on the chassis. A side wall is fixed to the base and has a plurality of apertures therein. A stop arm is movably mounted with respect to the side wall and has an abutment. The abutment has a periphery. A tine weldment is attached to the stop arm, and a tine wheel is rotatably mounted to the tine weldment. A pin passes through one of the apertures of the side wall and engages the periphery of the abutment of the stop arm. Upon a downward movement of the tine wheel, the stop arm moves with respect to the side wall until the pin abuts the periphery of the abutment, thus adjusting a maximum depth of the tine wheel below the chassis.

8 Claims, 2 Drawing Sheets

(56) References Cited

U.S. PATENT DOCUMENTS

| | | | |
|---|---|---|---|
| 5,562,166 A | 10/1996 | Griffin | |
| 5,569,106 A | 10/1996 | Splittstoesser et al. | |
| 5,673,756 A | 10/1997 | Classen | |
| 6,102,129 A | 8/2000 | Classen | |
| 6,708,773 B1 | 3/2004 | Kinkead et al. | |
| 6,758,283 B2 | 7/2004 | Lauer et al. | |
| 7,472,759 B2 * | 1/2009 | Petersen | A01B 45/023 172/101 |
| 8,561,713 B2 * | 10/2013 | De Bree | A01B 45/023 172/125 |
| 8,925,643 B2 | 1/2015 | Georgoulias et al. | |
| 9,686,898 B2 * | 6/2017 | De Bree | A01B 45/023 |
| 2004/0154811 A1 | 8/2004 | Kinkead et al. | |
| 2004/0200625 A1 * | 10/2004 | Petersen | A01B 45/023 172/21 |
| 2008/0196373 A1 * | 8/2008 | Wilson | A01B 45/026 56/10.1 |
| 2015/0342109 A1 * | 12/2015 | De Bree | A01B 45/023 172/1 |

\* cited by examiner

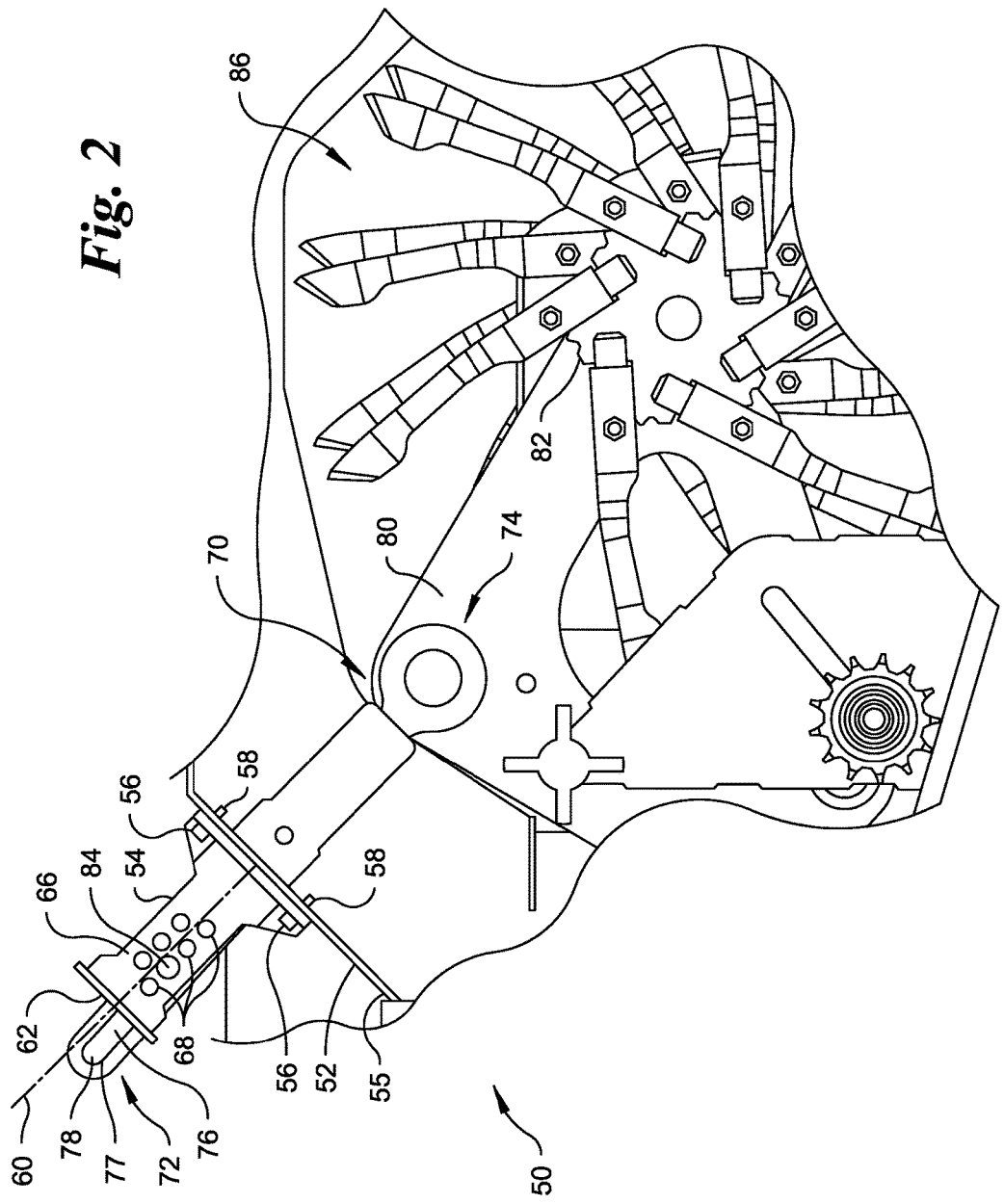

TINE DEPTH STOP MECHANISM FOR
SELF-PROPELLED, STAND-ON AERATOR

BACKGROUND OF THE INVENTION

The present invention relates generally to a stand-on aerator and, more particularly, to a tine depth stop mechanism for a self-propelled, stand-on aerator.

In the field of landscaping, turf aeration ("aeration") is the process of mechanically removing small plugs of soil from a lawn or other ground surface. Aeration is typically performed in a relatively limited portion of the year, spanning several weeks in the spring and several weeks in the fall. Because the aeration season is short, commercial landscapers need robust aeration equipment to maximize productivity. Commercial landscapers commonly employ mechanical, self-propelled power aerators ("aerators") that allow an operator to ride or stand on the aerator. These aerators have cutting members called "tines" for removing plugs of soil during the aeration process.

In performing aeration, commercial landscapers encounter a wide variety of turf and soil conditions. Many existing aerators remove soil cores of differing depths depending upon the soil conditions or terrain. Existing aerators tend to remove shallow soil cores when operating on hard, dry ground and to remove deep soil cores when operating on soft, moist ground—thus providing unwanted variation in the depth of the soil cores (sometimes referred to as "aeration depth").

Some existing aerators attempt to control aeration depth by allowing the operator to regulate a downward hydraulic pressure exerted on the tines during aeration. For an operator to control the aeration depth accurately by controlling the hydraulic pressure, the operator must know the proper aeration depth and must have the skill to adjust the hydraulic pressure in order to obtain the desired aeration depth. Landscaping contractors may employ persons who are not well versed in proper aeration techniques, including the proper aeration depth. As a result, in some circumstances, regulating the aeration depth by operator regulation of the hydraulic pressure leads to unsatisfactory results.

The presently preferred embodiment of the invention uses the weight of the aerator to drive the tines into the soil and includes a user-settable tine depth stop mechanism to control the maximum aeration depth. By providing a user-settable maximum aeration depth, the presently preferred embodiment of the invention removes soil cores of consistent depth while operating in a variety of soil conditions and terrains. Self-propelled power aerators, including both "stand on" and "ride on" aerators, may benefit from the user-settable tine depth stop mechanism according to the preferred embodiment of the present invention.

BRIEF SUMMARY OF THE INVENTION

Briefly stated, a tine depth stop mechanism is provided for an aerator (as defined above). The aerator includes a chassis having a forward end and a rearward end and a plurality of wheels engaging the ground. The tine depth stop mechanism comprises a base mounted on the chassis and a side wall fixed to the base. The side wall has a plurality of apertures therein. A stop arm is movably mounted with respect to the side wall and has an abutment. The abutment has a periphery. A tine weldment is attached to the stop arm, and a tine wheel is rotatably mounted to the tine weldment. A pin passes through one of the apertures of the side wall and engages the periphery of the abutment of the stop arm. Upon a downward movement of the tine wheel relative to the chassis, the stop arm moves with respect to the side wall sleeve until the pin abuts the periphery of the abutment. As a result, a maximum depth of the tine wheel below the chassis is adjusted by the pin passing through one of the plurality of apertures.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 2 is an enlarged right side elevational view of the tine depth stop mechanism of FIG. 1.

DETAILED DESCRIPTION OF THE INVENTION

Figure 1:
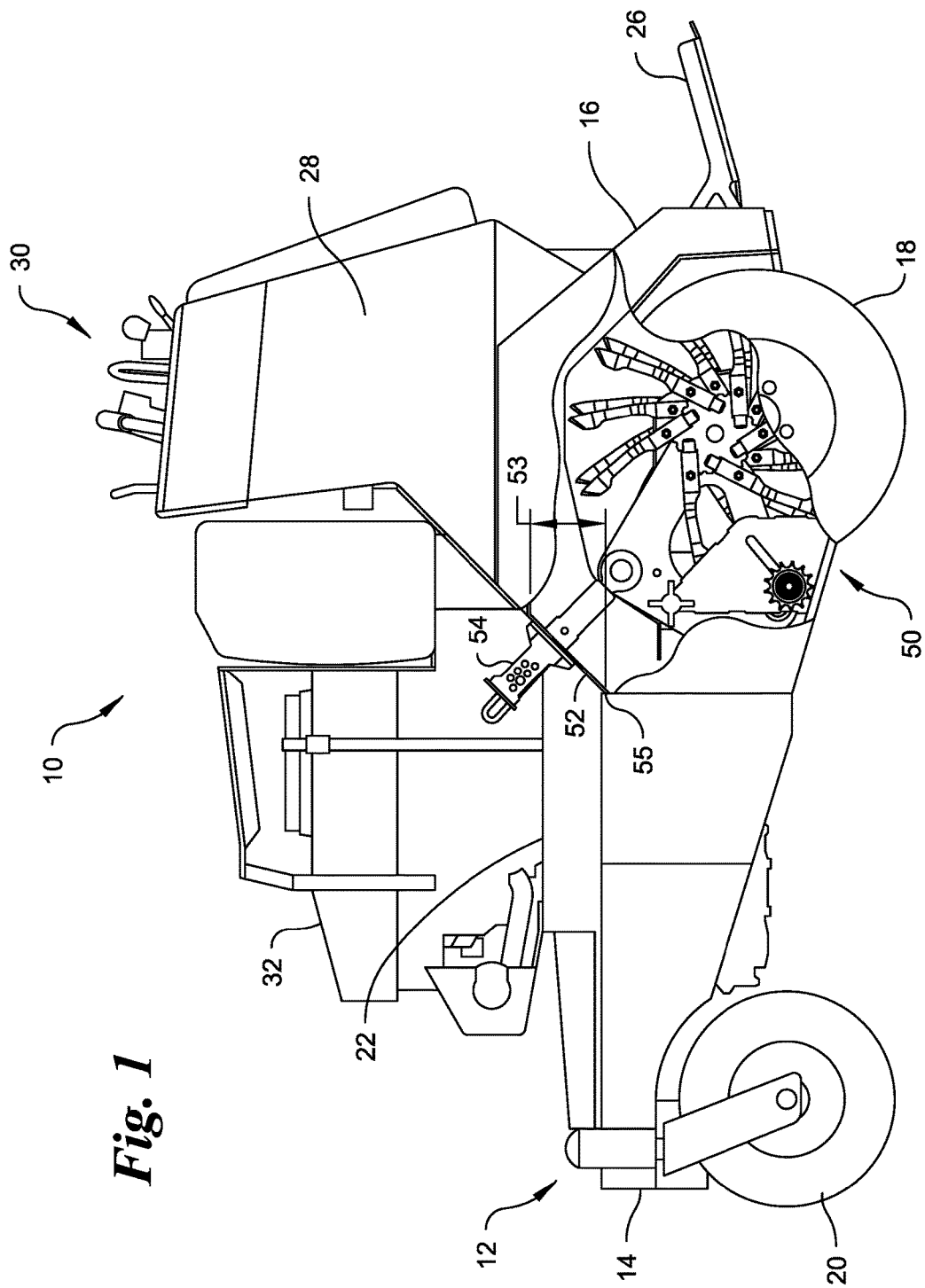
FIG. 1 is a right side elevational and partial cutaway view of a tine depth stop mechanism mounted on a stand-on aerator in accordance with a preferred embodiment of the present invention.

Certain terminology is used in the following description for convenience only and is not limiting. Unless specifically set forth herein, the terms "a", "an" and "the" are not limited to one element but instead should be read as meaning "at least one". The words "right", "left", "lower" and "upper" designate directions in the drawings to which reference is made. The words "inwardly" or "distally" and "outwardly" or "proximally" refer to directions toward and away from, respectively, the geometric center of the device and related parts thereof. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-2, a preferred embodiment of the present invention is directed to a tine depth stop mechanism 50 for an aerator 10. The aerator 10 includes a chassis 12 having a forward end 14 and a rearward end 16. The chassis 12 preferably has two propulsion wheels 18 (only one is shown) mounted near the rearward end 16 and two driven wheels 20 (only one is shown) mounted near the forward end 14 of the chassis 12. In alternative embodiments, the chassis 12 could include additional propulsion wheels 18 or additional driven wheels 20, or the chassis 12 could alternatively include only a single propulsion wheel 18 or a single driven wheel 20. In a preferred embodiment shown in FIGS. 1-2, the propulsion wheels 18 and the driven wheels 20 engage the ground (not shown) or other support surface to provide stability to the chassis 12. In the preferred embodiment, the chassis 12 includes an engine deck 22 supporting an engine 32, which is preferably an internal-combustion engine 32. In alternative embodiments, the engine 32 may be an electric motor, or any other form of propulsion device suited to the performance constraints of the aerator 10, for supplying rotational energy to the tine wheels 82 and the propulsion wheels 18. The chassis 12 preferably includes a platform 26 for a standing user (not shown) and a control tower 28 supporting a control panel 30 allowing the user to operate the aerator 10.

The aerator 10 includes a tine depth stop mechanism 50 mounted on the chassis 12. The tine depth stop mechanism 50 may be seen in the cutaway portion of FIG. 1 and in a partial elevational view in FIG. 2. The tine depth stop mechanism 50 includes a base 52, which in the preferred embodiment is a plate mounted to a hydraulic device (not shown), the hydraulic device being mounted to the chassis 12 proximate to the location where the propulsion wheels 18 are mounted. The base 52 has a vertical position 53 with respect to the chassis 12, and the vertical position 53 is preferably hydraulically adjustable by controlling the hydraulic or other actuator (not shown) via the control panel 30. The vertical position 53 is measured relative to any point on the base 52—for example, lowermost base portion 55—and any component fixed to the chassis 12—for example, the engine deck 22. The vertical position 53 is hydraulically adjustable by movement of a hydraulic device (not shown) where the direction of movement has a vector component perpendicular to the ground.

The tine depth stop mechanism 50 preferably comprises a side wall 66 which may be in the form of sleeve 54 having a longitudinal axis 60, a forward sleeve end 62, and a rearward sleeve end 64. The sleeve 54 is preferably fixed to the base 52 by nuts 56 and bolts 58; but other fasteners, welding, or other methods may be used to secure the sleeve 54 to the base 52. The sleeve 54 is preferably hollow or tubular, and the side wall 66 preferably has a plurality of apertures 68 extending therethrough, which are preferably essentially perpendicular to the longitudinal axis 60 of the sleeve 54. In other embodiments, the side wall 66 may preferably be a portion of a plate or other body, preferably with a plurality of apertures 68 extending therethrough.

The tine depth stop mechanism 50 also comprises a stop arm 70 movably mounted with respect to the side wall 66. In a preferred embodiment comprising a sleeve 54, the stop arm is preferably located at least partially with the sleeve 54. Alternatively, the stop arm 70 may be movably mounted with respect to the side wall 66 in other ways, including by being rotatably mounted with respect to the side wall 66, or by the stop arm 70 and the side wall 66 being mounted on parallel sliding members or rails. The stop arm 70 has a forward end portion 72, a rearward end portion 74, and an abutment having a periphery, the abutment preferably being a longitudinal slot 76 extending rearwardly from the forward end portion 72. The longitudinal slot 76 has a forwardmost end portion 78 along the periphery 77 of the longitudinal slot 76. The periphery of the abutment may include a closed shape formed by a depression or an opening (such as the longitudinal slot 76). Alternatively, the periphery of the abutment may be formed by a protruding body, which may have a closed shape or an open shape such as a "V" or "U" shape. In a preferred embodiment, the forward end portion 72 of the stop arm 70 protrudes from the forward sleeve end 62.

The stop arm 70 is telescopically mounted within the sleeve 54 with the forward end portion 72 of the stop arm 70 oriented toward the forward end 14 of the chassis 12. The stop arm 70 and the sleeve 54 may have any desired cross sections and may preferably be configured such that the stop arm 70 and the sleeve 54 fit together telescopically for relative translational motion. The tine depth stop mechanism 50 also comprises a tine weldment 80 attached to, and preferably pivotably attached to, the rearward end portion 74 of the stop arm 70. The tine depth stop mechanism 50 also comprises one or more tine wheels 82 (one is shown) rotatably mounted to the tine weldment 80. The tine wheels 82 form a tine bank 86, which removes soil cores from a turf or soil surface (not shown) when rolled across the surface and pressed into the surface by the weight of the aerator 10. The tine depth stop mechanism 50 also comprises a pin 84 passing through one of 5 the apertures 68 of the side wall and engaging the periphery of the abutment of the stop arm 70; in a preferred embodiment, the pin 84 engages the periphery 77 of the longitudinal slot 76 of the stop arm 70. Each aperture 68 corresponds to a selectable maximum depth of the tine wheels 82. Upon a downward movement of the tine wheels 82 relative to the chassis 12, the stop arm 70 moves translationally with respect to the sleeve 54 until the pin 84 abuts the forwardmost end portion 78 of the longitudinal slot 76. As a result, a maximum depth of the tine wheels 82 below the chassis 12 is adjusted by the pin 84 passing through one of the plurality of apertures 68.

One tine depth stop mechanism 50 is preferably provided on each side of the chassis 12. The two tine depth stop mechanisms 50 allow for control of the pressure on the tine bank 86 in changing terrain and soil conditions. In a preferred embodiment, the forward end portion 72 of each stop arm 70 protrudes from the forward sleeve end 62 of the corresponding sleeve 54 and thus acts as a visual indicator of the position of the tine bank 86 based on the position of the forward end portion 72 of the stop arm 70 relative to the sleeve 54.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined by the present disclosure.

I claim:

1. A tine depth stop mechanism for a self-propelled power aerator including a chassis having a forward end and a rearward end and a plurality of wheels engaging the ground comprising:
   a base mounted on the chassis;
   a side wall fixed to the base, the side wall having a longitudinal axis and a plurality of apertures therein, the plurality of apertures being distributed along the longitudinal axis of the side wall;
   a stop arm movably mounted with respect to the side wall, the stop arm having an abutment, and the abutment having a periphery;
   a tine weldment pivotally attached to the stop arm;
   a tine wheel rotatably mounted to the tine weldment;
   a pin adapted to be placed within a selected one of the apertures of the side wall and engaging the periphery of the abutment of the stop arm,
   wherein upon a downward movement of the tine wheel relative to the chassis, the stop arm moves with respect to the side wall until the pin abuts the periphery of the abutment of the stop arm, so that a maximum depth of the tine wheel below the chassis is adjusted by the pin passing through the selected one of the plurality of apertures.

2. The tine depth stop mechanism of claim 1, wherein the base has a vertical position relative to the chassis, and the vertical position is hydraulically adjustable.

3. A tine depth stop mechanism for a self-propelled power aerator including a chassis having a forward end and a rearward end and a plurality of wheels engaging the ground comprising:
- a base mounted on the chassis;
- a side wall fixed to the base, the side wall having a plurality of apertures therein;
- a stop arm movably mounted with respect to the side wall, the stop arm having an abutment, and the abutment having a periphery;
- a tine weldment attached to the stop arm;
- a tine wheel rotatably mounted to the tine weldment;
- a pin passing through one of the apertures of the side wall and engaging the periphery of the abutment of the stop arm,
- wherein the side wall is a sleeve having a longitudinal axis, a forward sleeve end, and a rearward sleeve end,
- wherein the stop arm has a forward end portion and a rearward end portion, and the abutment comprises a longitudinal slot extending rearwardly from the forward end portion, the longitudinal slot having a forwardmost end portion, the stop arm being telescopically mounted within the sleeve with the forward end portion of the stop arm oriented toward the forward end of the chassis,
- wherein the tine weldment is rotatably attached to the rearward end portion of the stop arm,
- wherein the pin passes through one of the apertures of the sleeve and engages the longitudinal slot of the stop arm, and
- wherein upon a downward movement of the tine wheel relative to the chassis, the stop arm moves translationally with respect to the sleeve until the pin abuts the forwardmost end portion of the longitudinal slot, so that a maximum depth of the tine wheel below the chassis is adjusted by the pin passing through one of the plurality of apertures.

4. The tine depth stop mechanism of claim 3, wherein the forward end portion of the stop arm protrudes from the forward sleeve end.

5. The tine depth stop mechanism of claim 3, wherein the apertures are essentially perpendicular to the longitudinal axis of the sleeve.

6. The tine depth stop mechanism of claim 4, wherein the apertures are essentially perpendicular to the longitudinal axis of the sleeve.

7. The tine depth stop mechanism of claim 3, wherein the base has a vertical position relative to the chassis, and the vertical position is hydraulically adjustable.

8. The tine depth stop mechanism of claim 4, wherein the base has a vertical position relative to the chassis, and the vertical position is hydraulically adjustable.

* * * * *